United States Patent [19]

Gray

[11] Patent Number: 4,539,620
[45] Date of Patent: Sep. 3, 1985

[54] CERAMIC CAPACITOR

[75] Inventor: Edmund Gray, Harlow, England

[73] Assignee: Standard Telephones and Cables, Public Limited Company, London, England

[21] Appl. No.: 580,213

[22] Filed: Feb. 15, 1984

[30] Foreign Application Priority Data

Mar. 2, 1983 [GB] United Kingdom ............... 8305759

[51] Int. Cl.³ .................. H01G 1/11; H01G 4/10
[52] U.S. Cl. .................................... 361/275; 361/321
[58] Field of Search ............................... 361/275, 321

[56] References Cited

U.S. PATENT DOCUMENTS 3,648,132 3/1972 Rayburn ..................... 361/321 X
3,896,354 7/1975 Coleman et al. .................. 361/321
4,107,762 8/1978 Shirn et al. ..................... 361/275 X
4,466,045 8/1984 Coleman ........................ 361/321 X Primary Examiner—Donald A. Griffin
Attorney, Agent, or Firm—Kerkam, Stowell, Kondracki & Clarke

[57] ABSTRACT

A ceramic chip capacitor comprises electrically conductive layers extending alternately to two opposing edges of a rectangular ceramic body. The other two edges are provided with electrical terminations. The edges to which the conductive layers extend are partially covered with fusible metallic films which connect the layers to respective terminations. The fusible films isolate the capacitor from associated circuitry if the capacitor fails and effects an internal short circuit.

8 Claims, 1 Drawing Figure

U.S. Patent
Sep. 3, 1985
4,539,620
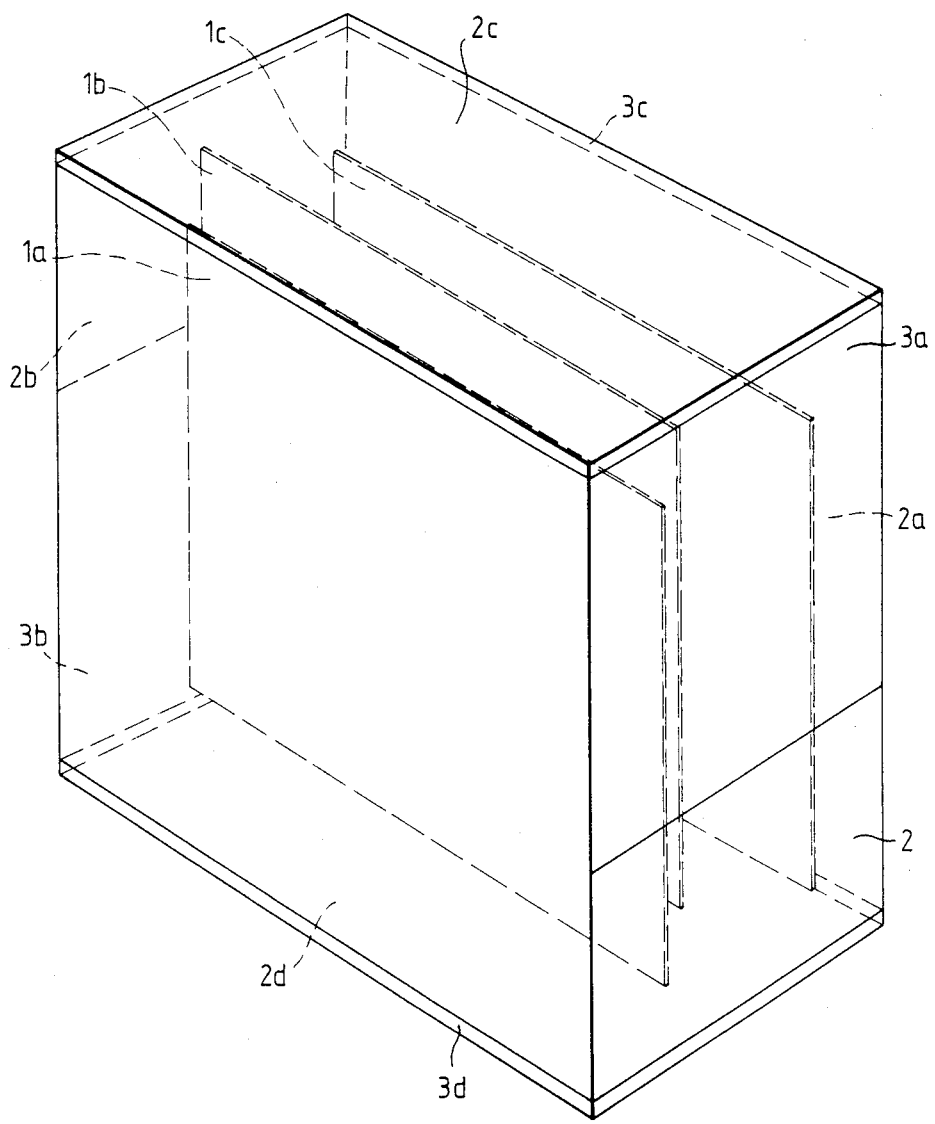

CERAMIC CAPACITOR

This invention relates to ceramic capacitors, such as are used for decoupling semiconductor integrated circuits from power supplies. Such capacitors are commonly used in the range 50 n F–1μ F.

One type of ceramic capacitor is the rectangular leadless chip capacitor. One example of such a capacitor is described in British Pat. No. 1,356,213. The capacitor is made up of a plurality of rectangular (or square layers), the two terminations are provided on two opposing edges of the capacitor, thereby leaving the other edges free from terminations. Each layer of electrically conductive material is so arranged as to extend to the edge on which is bonded its respective termination but not extend to the opposite edge. None of the layers of electrically conductive material extend to the other two edges, neither of which is provided with a termination. Thus, each layer of dielectric material is provided with a margin on two opposite edges which is not covered by electrically conductive material and, consequently, since the insulating and dielectric layers are generally made of identical or substantially identical materials, when the layers are bonded together, there is a substantially continuous margin at each of the two opposite edges of the capacitor formed by margins on each of the layers of dielectric material that are so firmly bonded together as to be essentially integral.

When a multilayer ceramic capacitor fails under an overload it normally goes to a short circuit condition. Large currents may then pass, causing local damage or even fire in the circuitry associated with the capacitor, depending on the circumstances. A similar condition can occur in solid tantalum capacitors. In IEE Transactions on Components, Hybrids, and Manufacturing Technology, Vol. CHMT-3, No. 2, June 1980, at page 244 et seq. there is an article describing the incorporation of a miniature fuse module into a solid tantalum capacitor. The fuse module comprises a fine bimetallic wire housed within a cavity in the electrically and thermally insulative body surrounding the capacitor. The fuse wire is electrically in series with the capacitor. The bimetallic wire is composed of metals which at a predetermined current reach a temperature at which an exothermic effect destroys the wire.

In yet another known construction disclosed in British patent application 2013031 A a monolithic ceramic capacitor has two sets of mutually parallel interdigitated sets of electrodes extending to one end face and one side face respectively of a ceramic body, where they contact respective conductive terminal layers. The other end face has a third terminal layer that does not contact any electrodes. A wire fuse link is connected externally of the body between the third terminal layer and one of the other terminal layers.

According to the present invention there is provided a ceramic capacitor comprising two or more parallel layers of electrically conductive material separated by dielectric material and enclosed in a body of ceramic material, the conductive layers extending alternatively to one only of two different edge or surface portions of the ceramic body, none of the layers extending to any other edge or surface portions of the body, two other edge or surface portions of the body being provided with respective electrically conductive terminations, each of said two edge or surface portions to which conductive layers extend being provided with an electrically conductive fusible film coating making electrical connection with all of the layers extending to that portion, said coatings each extending over a part of the body surface to make electrical connection to a respective one only of the terminations.

Embodiments of the invention will now be described, with reference to the accompanying drawing which illustrates a rectangular ceramic chip capacitor.

The capacitor illustrated comprises layers $1a$, $1b$, $1c$ of electrically conductive material, e.g. palladium, gold or alloys thereof, separated by and enclosed in ceramic material, alternate layers extending to opposite edges $2a$, $2b$ of the rectangular ceramic body 2. None of the layers extends to either of the other two edges $2c$, $2d$. Edges $2c$ and $2d$ are provided with metallic terminations $3c$, $3d$ which are conveniently silver. Edges $2a$ and $2b$ are provided with thin films $3a$, $3b$ which make electrical contact with terminations $3c$ and $3d$ respectively. Each of the films $3a$, $3b$ only partially covers its respective edge surface such that it makes electrical connection with all the conductive layers extending to that edge but does not make contact with the other termination. Typically the films $3a$, $3b$ are aluminium deposited by vacuum deposition. The melting point of the film must exceed soldering temperatures the capacitor would normally experience. In use any overload which causes the capacitor to fail internally to a short circuit will result in the film failing to an open circuit condition, thus preventing a prolonged excessive current passing through the capacitor. This would also provide a visual indication that the capacitor had failed.

An alternative to a single metal film deposited as described above is the use of a multilayer film the components of which would react at an elevated temperature to produce a highly resistive film and cause the capacitor to become effectively open circuit. For example the film may be a multilayer film of aluminium, gold and silicon.

I claim:

1. A ceramic capacitor comprising two or more parallel layers of electrically conductive material separated by dielectric material and enclosed in a body of ceramic material, the conductive layers extending alternatively to one only of two different edge or surface portions of the ceramic body, none of the layers extending to any other edge or surface portions of the body, two other edge or surface portions of the body being provided with respective electrically conductive terminations, each of said two edge or surface portions to which conductive layers extending being provided with an electrically conductive fusible film coating making electrical connection with all of the layers extending to that portion, said coatings each extending over a part of the body surface to make electrical connection to a respective one only of the terminations.

2. A capacitor according to claim 1 wherein said film coatings are vacuum deposited aluminium.

3. A capacitor according to claim 2, wherein said ceramic body is rectangular with the conductive layers extending alternatively to two opposing edges and the terminations are provided on the other two edges.

4. A capacitor according to claim 1 wherein said film coatings are multilayer films which react at elevated temperature to produce a highly resistive film.

5. A capacitor according to claim 4 wherein said multilayer film comprises layers of aluminium, gold and silicon.

6. A capacitor according to claim 5, wherein said ceramic body is rectangular with the conductive layers extending alternatively to two opposing edges and the terminations are provided on the other two edges.

7. A capacitor according to claim 4, wherein said ceramic body is rectangular with the conductive layers extending alternatively, to two opposing edges and the terminations are provided on the other two edges.

8. A capacitor according to claim 1 wherein said ceramic body is rectangular with the conductive layers extending alternately to two opposing edges and the terminations are provided on the other two edges.

* * * * *